United States Patent [19]
Okamura et al.

[11] Patent Number: 5,598,081
[45] Date of Patent: Jan. 28, 1997

[54] VECTOR CONTROL METHOD FOR CONTROLLING A ROTOR SPEED OF AN INDUCTION MOTOR

[75] Inventors: Yukihiko Okamura, Hirakata; Hiroaki Yuasa, Shijonawate; Tadayoshi Mukai, Izumisano, all of Japan

[73] Assignee: Matsushita Electric Works, Ltd., Kadoma, Japan

[21] Appl. No.: 310,762

[22] Filed: Sep. 27, 1994

[30] Foreign Application Priority Data

Sep. 27, 1993 [JP] Japan .................................. 5-239945
May 31, 1994 [JP] Japan .................................. 6-119204
Jun. 1, 1994 [JP] Japan .................................. 6-119953

[51] Int. Cl.⁶ .................................................. H02P 5/34
[52] U.S. Cl. .......................... 318/801; 388/815; 388/823; 318/798; 318/52; 318/805
[58] Field of Search .................................. 318/801–815, 318/52, 798–800; 388/800, 806, 815, 823; 363/41; 364/37

[56] References Cited

U.S. PATENT DOCUMENTS

| | | | |
|---|---|---|---|
| 4,680,526 | 7/1987 | Okuyama et al. | |
| 4,862,343 | 8/1989 | Nomura et al. | 363/41 |
| 5,032,771 | 7/1991 | Kerkman et al. | 318/52 |
| 5,175,483 | 12/1992 | Fuji et al. | 318/807 |
| 5,264,773 | 11/1993 | Koyama et al. | 318/798 |
| 5,357,181 | 10/1994 | Mutoh et al. | 318/811 X |
| 5,365,158 | 11/1994 | Tanaka et al. | 318/806 |

FOREIGN PATENT DOCUMENTS

0105511  4/1984  European Pat. Off. .
0279415  8/1988  European Pat. Off. .

OTHER PUBLICATIONS

Patent Abstracts of Japan, Jan. 30, 1985, 9:120 and JP-A-59 169 382 (Abstract).
Patent Abstracts of Japan, Oct. 18, 1990, 14:128 and JP-A-02 197 284 (Abstract).

Primary Examiner—William M. Shoop, Jr.
Assistant Examiner—Karen Masih
Attorney, Agent, or Firm—Armstrong, Westerman, Hattori, McLeland & Naughton

[57] ABSTRACT

A vector control method is provided for controlling a rotor speed of an induction motor by an inverter which provides an AC current of varying frequency to the induction motor, and a vector controller which provides control voltage Vu, Vv, Vw, in response to an excitation current command $i_{1d^*}$. The excitation current command is indicative of an excitation current being fed to the induction motor, a desired rotation speed command $\omega_{r^*}$, and a primary frequency $\omega$, for controlling the inverter to vary the rotor speed. The method includes the steps of detecting a primary current being fed to the induction motor, analyzing the detected primary current to obtain an excitation current $i_{1d}$ and a detected torque current $i_{1q}$, multiplying a torque value represented by the detected torque current $i_{1q}$ by a predetermined motor constant $K_m$ to obtain a slip frequency $\omega_s$, and adding the obtained slip frequency $\omega_s$ to the rotation speed command $\omega_{r^*}$ to determine the primary frequency $\omega$ ($\omega=\omega_{r^*}+\omega_s$), calculating a deviation between the delay torque current $i_{1q'}$ and the detected torque current $i_{1q}$ and supplying the deviation to a proportional plus integral controller, the proportional plus integral controller producing as an output an updated delayed torque current $i_{1q'}$ as the torque value for determining the primary frequency $\omega$.

15 Claims, 13 Drawing Sheets

VECTOR CONTROL METHOD FOR CONTROLLING A ROTOR SPEED OF AN INDUCTION MOTOR

BACKGROUND OF THE INVENTION

1. Field of the Invention

The present invention is directed to a vector control method for controlling a rotor speed of an induction motor, and more particularly to such a vector control method for the induction motor without relying upon a speed detector.

2. Description of the Prior Art

A vector control system for the induction motor is known in the art to be advantageous for quick and precise control of the induction motor, in which a control is made to vary a frequency of a primary current supplied to the induction motor. U.S. Pat. No. 4,680,526 discloses a vector control system for the induction motor in which the primary current is analyzed to detect an excitation current and a torque current. These detected currents are processed to give an estimated rotation speed of the motor without using a speed detector. Thus estimated rotation speed is processed in relation to a speed command signal representative of an intended rotation speed in order to obtain a required torque current at which the estimated rotation speed becomes equal to the intended rotation speed, after which the required torque current is compared with the detected torque current for determining the primary frequency. Thus, this method requires speed operation for obtaining the estimated rotation speed, in addition to current operation of determining the primary frequency, therefore necessitates complicated operations.

To avoid the complicated operations for determination of the primary frequency, it is contemplated to obtain a slip frequency as a product of the detected torque current and a predetermined motor constant, and to determine the primary frequency as the sum of the slip frequency and a the rotation speed command signal selected by the user. However, this scheme poses another problem that the slip frequency is directly influenced by a transient variation in the torque current caused when changing the motor speed, i.e., changing the rotation speed command signal, resulting in an over-responsive variation in the primary frequency. Therefore, the above scheme fails to give precise speed control of the motor.

SUMMARY OF THE INVENTION

The above problem has been eliminated in a vector control method for an induction motor in accordance with the present invention which is capable of assuring precise and consistent speed control, yet without relying upon a speed detector. The vector control method of the present invention utilizes an inverter which provides an AC current of varying and frequency to the induction motor, and a vector controller. The vector controller provides control voltage Vu, Vv, Vw, in response to an excitation current command $i_{1d}{}^*$ indicative of an excitation current being fed to said induction motor, a desired rotation speed command $\omega_r{}^*$, and a primary frequency $\omega$, for controlling the inverter to vary a motor speed. The method comprises the steps of:

monitoring a primary current being fed to the induction motor to derive therefrom an excitation current $i_{1d}$ and a torque current $i_{1q}$;

multiplying a torque value represented by thus detected torque current $i_{1q}$ by a predetermined motor constant Km to obtain a slip frequency; and adding thus obtained slip frequency $\omega_s$ to the rotation speed command $\omega_r{}^*$ to determine the primary frequency $\omega(\omega=\omega_r{}^*+\omega_s)$.

The method is characterized to delay by integration the detected torque current $i_{1q}$ in order to give a delayed torque current $i_{1q}'$ as the torque value to be processed in determining the primary frequency $\omega$. The delayed torque current $i_{1q}'$ is obtained by proportioning and integrating a deviation between the delayed torque current $i_{1q}'$ and the detected torque current $i_{1q}$. By using thus delayed torque current for determination of the slip frequency $\omega_s$, it is possible to cancel undesired transient variation from appearing in the calculated slip frequency and therefore the primary frequency, thereby assuring a consistent and precise speed control, which is therefore a primary object of the present invention.

Additionally, the present invention provides effective methods for correctly determining the motor constant so as to enable more precise speed control irrespective of possible variation in the motor constant. The motor constant is a function of a required excitation current specific to the motor, a primary resistance, secondary resistance and an inductance of the motor which may vary for individual motors or in different temperature environments.

The excitation current is acknowledged in the vector controller in the form of the excitation current command $i_{1d}{}^*$ which is corrected by zeroing the difference between the excitation current command $i_{1d}{}^*$ and the detected excitation current $i_{1d}$ from the primary current, so that the vector controller operates based upon thus corrected excitation current command $i_{1d}{}^*$ to give the control voltage.

The primary resistance is input to the vector controller as a primary resistance set value $r_1{}^*$ which is corrected by zeroing a difference between the excitation current command $i_{1d}{}^*$ and the detected excitation current $i_{1d}$, under a condition of supplying the primary current to the induction motor while stalling the motor. The secondary resistance is input to the vector controller as a secondary resistance set value $r_2{}^*$ which is corrected by zeroing a difference between the excitation current command $i_{1d}{}^*$ and the detected excitation current $i_{1d}$, so that the vector controller operates based upon thus corrected secondary resistance set value $r_2{}^*$ to give the control voltage.

A primary inductance $L_1$ can be corrected in terms of the excitation current command $i_{1d}{}^*$ due to the fact that flux parameter $\phi$ is constant for the motor and is expressed as $\phi = L_1 \cdot I_{1d}{}^*$. In view of that the excitation current will vary due to only an error in the primary inductance $L_1$ when the rotation speed is just varying, the correction of the excitation current in this condition can stand for the correction of the primary inductance. To this end, the correction of the primary inductance $L_1$ is made by zeroing the difference between the excitation current command $i_{1d}{}^*$ and the detected excitation current $i_{1d}$, under a condition of varying the rotation speed.

These and still other advantageous features will become more apparent from the following description of the preferred embodiments when taken in conjunction with the attached drawings.

BRIEF DESCRIPTION OF THE DRAWINGS

FIGS. 9A and 9B are graphs illustrating operations of the system of FIG. 8, respectively;

DETAILED DESCRIPTION OF THE EMBODIMENTS

First embodiment <FIGS. 1 to 5>

Figure 1:
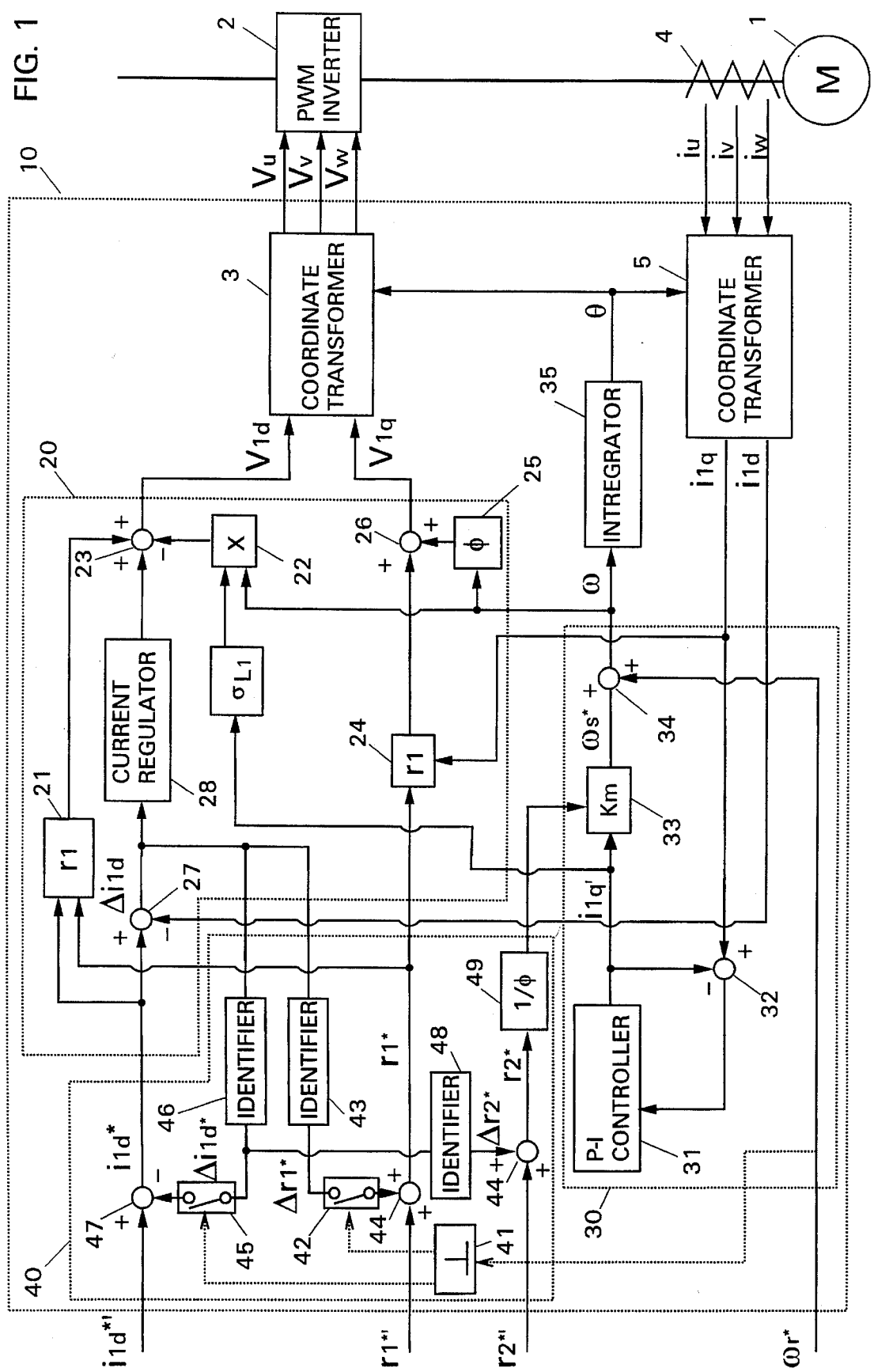
FIG. 1 is a block diagram of a vector control system utilized in accordance with a first embodiment of the present invention.

Referring now to FIG. 1, there is shown a vector control system realizing a method in accordance with a first embodiment of the present invention. A three-phase induction motor 1 is driven by a voltage inverter 2 under control of a vector controller 10. The voltage inverter 2 regulates an input DC voltage by a pulse width modulation (PWM) to supply a primary AC current of varying voltage and frequency to a stator of the motor 1 for control of a rotor speed, in response to control voltage signals Vv, Vu, Vw generated from the vector controller 10. A current sensor 4 is provided to sense the primary current being fed to the motor to give a set of three current signals Iu, Iv, Iw which are received as feedback signals at the vector controller 10.

Prior to discussing the present invention, a reference is made to an operating condition of the induction motor which are expressed by the following matrix of equations in a reference (direct-quadrature) frame rotating at a speed of rotor flux vector (primary frequency):

$$\begin{bmatrix} V_{1d} \\ V_{1q} \\ 0 \\ 0 \end{bmatrix} = \begin{bmatrix} r_1 + \sigma \cdot L_1 \cdot p & -\sigma \cdot L_1 \cdot \omega & (M/L_2) \cdot p & -(M/L_2) \cdot \omega \\ \sigma \cdot L_1 \cdot \omega & r_1 + \sigma \cdot L_1 \cdot p & (M/L_2) \cdot \omega & (M/L_2) \cdot p \\ -M \cdot r_2/L_2 & 0 & (r_2/L_2) + p & -\omega_s \\ 0 & -M \cdot r_2/L_2 & -\omega_s & (r_2/L_2) + p \end{bmatrix} \begin{bmatrix} i_{1d} \\ i_{1q} \\ \phi_{2d} \\ \phi_{2q} \end{bmatrix} \quad (1)$$

where $V_{1d}$=d-axis component of a primary (stator) voltage;

$V_{1q}$=q-axis component of the primary voltage;

$r_1$=primary (stator) resistance;

$r_2$=secondary (rotor) resistance, $L_1$=primary (stator) inductance;

$L_2$=secondary (rotor) inductance;

$M$=mutual (stator/rotor) inductance;

σ=leakage coefficient expressed by $$\sigma = 1 - \frac{M^2}{L_1 \cdot L_2} \; ;$$

$i_{1d}$=excitation current, i.e., d-axis component of the primary (stator) current;

$i_{1q}$=torque current, i.e., q-axis component of the primary current;

$\omega_s$=slip frequency;

$\phi_{2d}$=d-axis component of secondary flux vector;

$\phi_{2q}$=q-axis component of secondary flux vector; and p=differential operator (=d/dt).

Additionally, the following parameters are utilized in the description of the present invention:

$i_{1d}^*$: excitation current command;

$i_{1q}'$: torque current signal;

$\omega_r^*$: rotation speed command;

$\omega$: primary frequency;

θ: phase angle demand:

$r_1^*$: primary resistance set value; and $r_2^*$: secondary resistance set value.

The secondary flux vectors $\phi_{2d}$ and $\phi_{2q}$ in the above matrix (1) can be expressed respectively by the equations:

$$\phi_{2d} = M \cdot i_{1d} + L_2 \cdot i_{2d}$$

$$\phi_{2q} = M \cdot i_{1q} + L_2 \cdot i_{2q} \quad (2)$$

Basically, the vector control is designed to choose a suitable primary current in order to establish the relations, $$\phi_{2d} M \cdot i_{1d} (=\text{constant}) \text{ and } \phi_{2q} = 0.$$

With this result, the slip frequency $\omega_s$ can be derived from the matrix (1) and be expressed by the equation:

$$\omega s = \frac{M \cdot r_2}{L_2 \cdot \phi_{2d}} \cdot i_{1q} \quad (3)$$

If $\phi_{2d} = M \cdot i_{1d}$ (=constant) and $\phi_{2q} = 0$ are not established, then the slip frequency $\omega_s$ is expressed below:

$$\omega s = \frac{M \cdot r_2}{L_2 \cdot \phi_{2d}} \cdot i_{1q} - \frac{r_2 \cdot \phi_{2q}}{L_2 \cdot \phi_{2d}} \quad (4)$$

In other words, the vector control is made to eliminate the second term of the above equation (4) by choosing the primary current supplied from the inverter 2 to the motor 1 and the primary frequency ω. The primary frequency ω is determined to be the slip frequency $\omega_s$ plus the speed command $\omega_r^*$, that is, $\omega = \omega_s + \omega_r^*$, which is combined with equation (3) to give the following equation:

$$\omega = \frac{M \cdot r_2}{L_2 \cdot \Phi_{2d}} \cdot i_{1q} + \omega r^* = Km \cdot i_{1q} + \omega r^* \quad (5)$$

where

Km represents a motor constant specific to the induction motor. Since the motor constant Km is assumed to be fixed, the primary frequency ω can be influenced only by the torque current $i_{1q}$ and speed control command signal $\omega_r^*$ so that a speed control is made based upon the above vector control by regulating the primary current in a feedback manner.

Now, a discussion is made to the control system of FIG. 1. The vector controller 10 comprises a vector processor 20 responsible for realizing the above relations $\phi_{2d}=M\cdot i_{1d}(=$ constant) and $\phi_{2q}=0$, a speed controller 30, and a compensator 40 for correcting inputs of excitation current command $i_{1d}^{*i}$, primary resistance set value $r_1^{*i}$, and secondary resistance set value $r_2^{*i}$.

The vector processor 20 provides d-axis voltage component (excitation voltage) $V_{1d}$ and q-axis voltage component (torque voltage) $V_{1q}$ by processing inputs of excitation current command $i_{1d}^*$, torque current signal $i_{1q}'$ derived from the detected torque current $i_{1q}$, and primary frequency $\omega$. This is made by executing the following matrix which is derived by putting $\phi_{2d}=M\cdot i_{1d}(=$constant) and $\phi_{2q}=0$ into equation (1):

$$\begin{bmatrix} V1d \\ V1q \end{bmatrix} = \begin{bmatrix} R1 & -\sigma \cdot L1 \cdot \omega \\ L1 \cdot \omega & R1 \end{bmatrix} \begin{bmatrix} i1d^* \\ i1q^* \end{bmatrix} \quad (6)$$

That is, the excitation voltage $V_{1d}$ is obtained by:
- multiplying the excitation current command signal $i_{1d}^*$ by primary resistance $r_1$ at a multiplier 21 to give a first product;
- multiplying torque current signal $i_{1q}'$ by leakage coefficient $\sigma$, primary inductance $L_1$, and primary frequency $\omega$ at a multiplier 22 to give a second product; and
- subtracting the second product from the first product at a subtracter 23.

The torque voltage $V_{1q}$ is obtained by:
- multiplying primary inductance $L_1$ by excitation current command $i_{1d}^*$ to obtain a flux parameter $\phi(\phi=L_1\cdot i_{1d}^*)$;
- multiplying the detected torque current $i_{1q}$ by primary resistance $r_1$ at a multiplier 24 to give a third product;
- multiplying primary frequency $\omega$ by flux parameter $\phi$ at a multiplier 25 to give a fourth product; and
- adding third and fourth products at an adder 26.

Thus obtained excitation voltage $V_{1d}$ and torque voltage $V_{1q}$ are fed to a coordinate transformer 3 where they are transformed, in accordance with a phase angle demand $\theta$, into the control voltage signals Vv, Vv, and Vw which regulates the inverter 2 for speed control of the motor 1. The phase angle demand $\theta$ is derived by integrating the primary frequency $\omega$ at an integrator 35, and is also utilized in a coordinate transformer 5 for transformation of the sensed currents Iu, Iv, Iw from the current sensor 4 into the excitation current $i_{1d}$ and torque current $i_{1q}$.

The speed controller 30 provides the torque current signal $i_{1q}'$ as well as the primary frequency $\omega$ for determination of the excitation voltage $V_{1d}$ and torque voltage $V_{1q}$ at the vector processor 20, in response to speed command signal $\omega_r^*$ selected by the user and the sensed torque current $i_{1q}$ from the current sensor 4. Included in the speed controller 30 is a proportional plus integral (P-I) controller 31 which provides the torque current signal $i_{1q}'$ as a delayed signal of the sensed torque current $i_{1q}$, in order to eliminate over-responsive vector control which would otherwise appears during a transient period of changing the motor speed. In the transient period, the operating condition of the motor can be expressed by the following matrix (7) of equation, which is a modification of the above matrix (1) for stable operating condition.

$$p\begin{bmatrix} (l1+l2')i1d \\ (l1+l2')i1q \\ \phi 2d \\ \phi 2q \end{bmatrix} = \begin{bmatrix} -(r1+r2') & \omega(l1+l2') & r2'/M & \omega r \cdot M/L2 \\ -\omega(l1+l2') & -(r1+r2') & -\omega r \cdot M/L2 & r2'/M \\ M \cdot r2/L2 & 0 & -r2/L2 & \omega s \\ 0 & M \cdot r2/L2 & -\omega s & -r2/L2 \end{bmatrix} \begin{bmatrix} i1d \\ i1q \\ \phi 2d \\ \phi 2q \end{bmatrix} + \begin{bmatrix} V1d \\ V1q \\ 0 \\ 0 \end{bmatrix} \quad (7)$$

where
- $l_1$ and $l_2$=primary and secondary leakage inductance, respectively;
- $r_2'=r_2\cdot(M/L_2)^2$; and
- $l_2'=l_2\cdot M/L_2$.

The slip frequency $\omega_s$ in this transient period can be derived by combining equation (6) into equation (7) and is expressed by the following equation (8).

$$\omega s = \frac{r2 \cdot M}{L2 \cdot \phi 2d} \cdot i1q + \frac{(l1+l2') \cdot L2}{M \cdot \phi 2d} \cdot p \cdot i1q \quad (8)$$

Figure 2A:
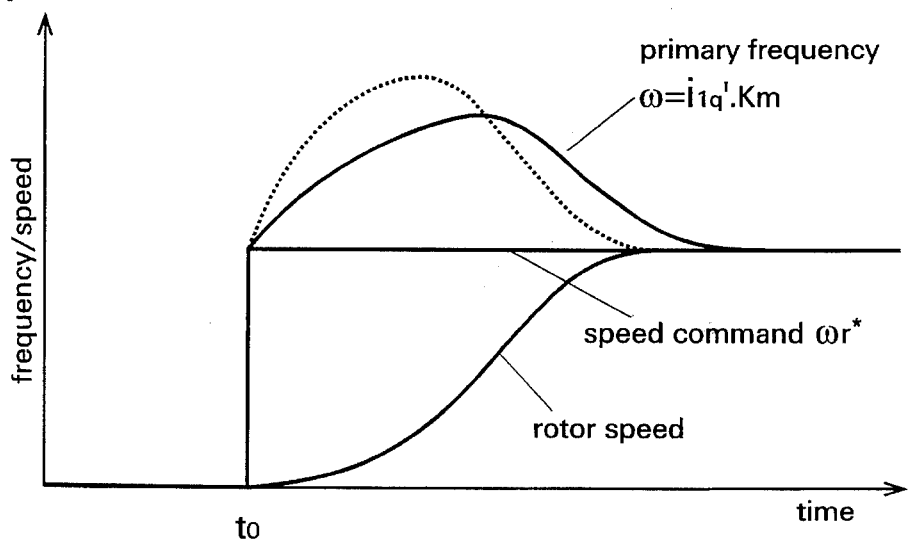
FIGS. 2A, 2B, 3, 4, 5 are graphs illustrating the operations of the present invention, respectively.
Figure 2B:
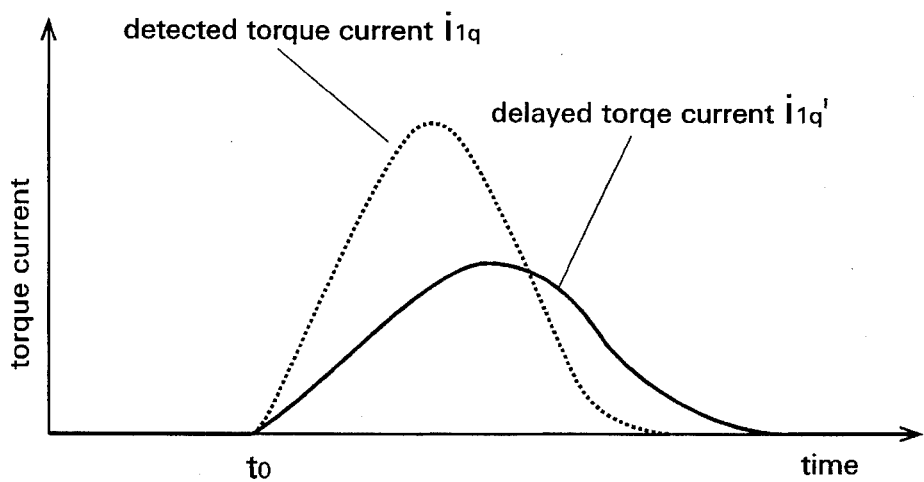

Consequently, the differential term of equation (8) gives a corresponding effect to the slip frequency $\omega_s$ and therefore the resulting primary frequency $\omega(=\omega_s+\omega_r^*)$ in the transient period. When, for example, the speed command signal $\omega_r^*$ is incremented at a time $t_0$, as shown in FIGS. 2A and 2B, torque current $i_{1q}$ responds to vary along a sharp curve indicated by dotted line in FIG. 2B. If the torque current $i_{1q}$ is directly processed, the resulting slip frequency $\omega_s$ and the primary frequency $\omega$ suffer from correspondingly marked variation, which causes the over-responsive speed control. In view of the above, the P-I controller 31 gives the torque current signal $i_{1q}'$, as indicated by solid line in FIG. 2B, which is a delayed signal of the sensed torque current $i_{1q}$. The P-I controller 31 operates to multiply a deviation between its output (delayed torque current signal $i_{1q}'$) and input (sensed torque current $i_{1q}$) by a suitable constant and to integrate the deviation in such a manner as to zero the deviation calculated at a subtracter 32. The resulting delayed torque current, i.e., torque current signal $i_{1q}'$ is multiplied by the motor constant Km at a multiplier 33 to give slip frequency $\omega_s$ which is then added to speed command signal $\omega_r^*$ at an adder 34 to provide the primary frequency $\omega$. As seen from FIGS. 2A and 2B, the use of delayed torque current of moderated waveform as the torque current signal $i_{1q}'$ results in a correspondingly moderated primary frequency $\omega$, thereby avoiding over-responsive speed control and assuring consistent vector control of the motor speed when changing the motor speed.

Also in the present invention, the torque voltage $V_{1q}$ is obtained by directly processing the sensed torque current $i_{1q}$ rather than the delayed torque current signal $i_{1q}'$ so as to improve speed response characteristic under varying torque conditions, while the delayed torque current signal $i_{1q}^*$ is utilized to determine the motor constant Km for maintaining the effect of avoiding over-responsive motor control.

In addition, the control system of the present embodiment includes schemes of providing correct motor constant Km for accurate vector control. As described hereinbefore, the motor constant Km is known to be specific to the motor and can be input in the control system as a fixed value. However, if the motor constant Km should differ from an actual motor constant, the vector controller fail to produce correct excitation and torque voltages $V_{1d}$ and $V_{1q}$, which in turn varies the excitation current and the torque current in a direction of failing to satisfy the relations $\phi_{2d}=M \cdot i_{1d}(=\text{constant})$ and $\phi_{2q}=0$, which eventually results in an erroneous vector control.

The erroneous variations in the excitation and torque voltages $\Delta V_{1d}$ and $\Delta V_{1q}$ (error voltages) due to an error in the motor constant Km are expressed as follows:

$$\Delta V_{1d} = \Delta r_1 \cdot i_{1d}^* - \sigma \cdot \Delta L_1 \cdot \omega \cdot i_{1q}^*$$

$$\Delta V_{1q} = \Delta L_1 \cdot \omega \cdot I_{1d}^* - \Delta r_1 \cdot i_{1q}^* \quad (9)$$

where $\Delta r_1 = r_1 - r_1^*$ $\Delta L_1 = L_1 - L_1^*$ where $r_1^*$ and $L_1^*$ are set values respectively for primary resistance and primary inductance.

Figure 3:
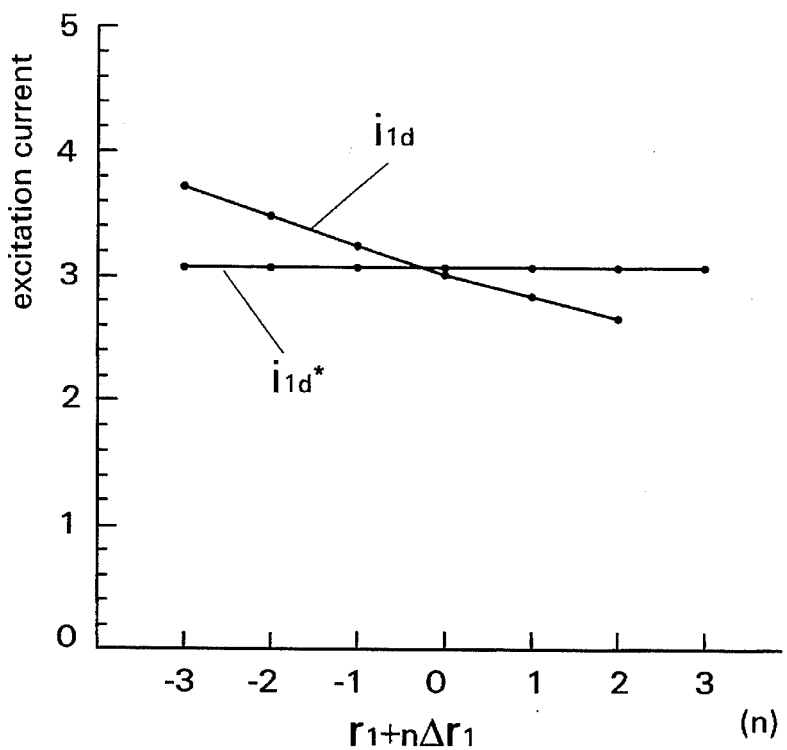
Figure 4:
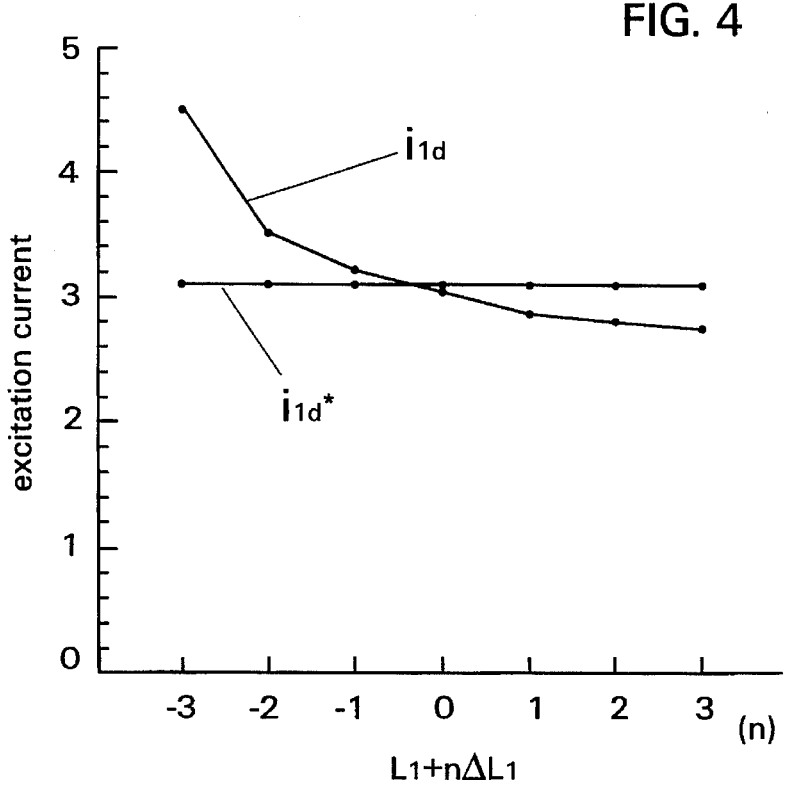

From equation (9), it is known that error voltages $\Delta V_{1d}$ and $\Delta V_{1q}$ in excitation and torque voltages are the consequence of errors $\Delta r_1$ and $\Delta L_1$ with respect to the set values $r_1^*$ and $L_1^*$, that error voltages result critically from $\Delta r_1$ when primary frequency $\omega$ is small, and that error voltages result critically from $\Delta L_1$ when primary frequency $\omega$ is large. FIG. 3 illustrates corresponding variations in the excitation current $i_{1d}$ with respect to excitation current command $i_{1d}^*$ when the actual primary resistance $r_1$ differs from the primary resistance set value $r_1^{*i}$. FIG. 4 illustrates corresponding variations in the excitation current $i_{1d}$ with respect to excitation current command $i_{1d}^*$ when the actual primary inductance $L_1$ differs from the set primary resistance $L_1^{*i}$. Also known from equation (9) is that error voltages $\Delta V_{1d}$ and $\Delta V_{1q}$ is free from the error in $\Delta L_1$ when primary frequency $\omega$ is zero, i.e., the motor is stalled.

Compensation for primary resistance $r_1$

Figure 5:
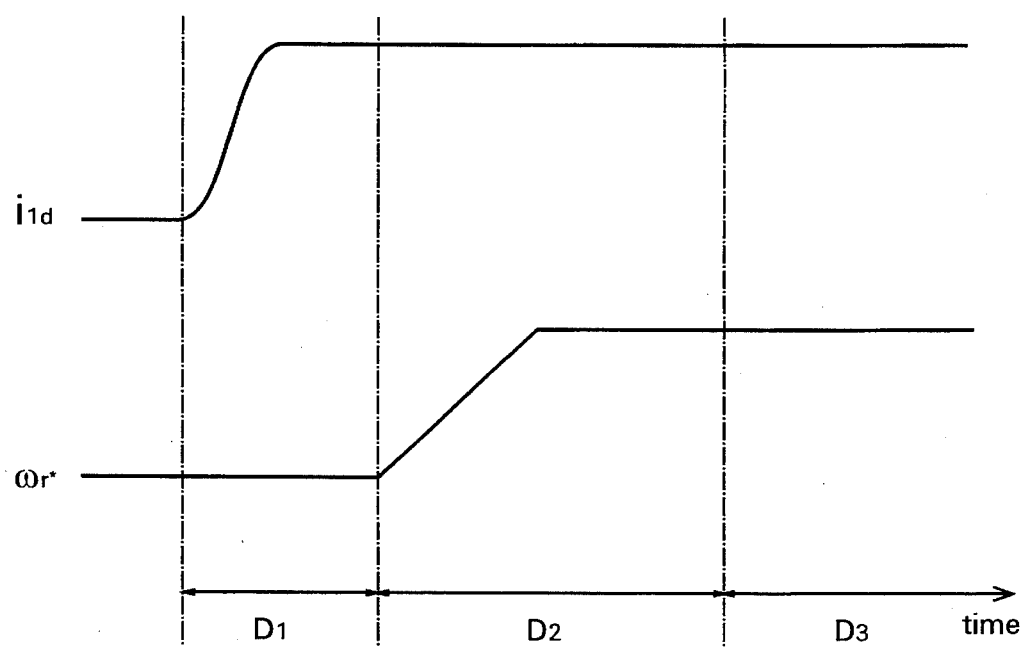

In view of that the excitation voltage error $\Delta V_{1d}$ is not influenced by the primary inductance error $\Delta L_1$ when the primary frequency $\omega$ is zero, a correct primary resistance $r_1^*$ is obtained by regulating the excitation current command $i_{1d}^*$ under a condition of stalling the motor. The compensation sequence starts by the speed controller 30 issuing speed command $\omega_r^*$ to stall the motor for a time period $D_1$, as shown in FIG. 5. During this period $D_1$, the speed controller 30 actuates a switch regulator 41 for closing a switch 42 so as to connect a resistance identifier 43 in circuit between an output of a subtracter 27 in the vector processor 20 and an adder 44. The identifier 43 is a P-I controller which gives an error voltage $\Delta r_1$ required for zeroing a difference $\Delta i_{1d}$ between the excitation current command $i_{1d}^*$ and the detected excitation current $i_{1d}$. Thus obtained error resistance $\Delta r_1$ is then added at the adder 44 to the initially set primary resistance $r_1^{*i}$ to give a true primary resistance $r_1^*$ to be utilized in the vector processor 20.

Compensation for primary inductance $L_1$

After obtaining the true primary resistance, the motor controller 30 gives speed command $\omega_r^*$ to vary the speed for a time period $D_2$, as shown in FIG. 5, in order to obtain a true primary inductance $L_1$. Because of that the excitation current $i_{1d}$ will fluctuate only by the effect of primary inductance error $\Delta L_1$ while the motor speed varies, and also because of that the flux parameter $\phi(=L_1 \cdot i_{1d})$ is constant for the same rated induction motors, it is made to compensate for the excitation current on behalf of compensating for the primary inductance. In this period $D_2$, the speed controller 30 actuates the switch regulator 41 to open the switch 42 and close a switch 45 so as to connect another current identifier 46 in a circuit between the output of the subtracter 27 and a subtracter 47. The current identifier 47 is a P-I controller which gives an error current $\Delta i_{1d}^*$ required for zeroing a difference $\Delta i_{1d}$ between the excitation current command $i_{1d}^*$ and the sensed excitation current $i_{1d}$. Thus obtained error current $\Delta i_{1d}^*$ is then subtracted at subtracter 47 from an initially set excitation current command $i_{1d}^{*i}$ to provide the true current excitation command $i_{1d}^*$ utilized in the vector processor 20.

Compensation for secondary resistance $r_2$

The system further necessitates to compensate for secondary resistance $r_2$ in order to give more consistent speed control based upon the precisely determined motor constant Km, since the motor constant Km is also a function of the secondary resistance, as seen from the equation below, and the secondary resistance $r_2$ will vary as a consequence of compensating the primary inductance $L_1$.

$$Km = \frac{M \cdot r2}{L2 \cdot \phi 2d}$$

Since $\phi_{2d}$ is nearly equal to $M \cdot i_{1d}$ and $L_2$ is nearly equal to $L_1$, the above equation is simplified into $$Km \cong \frac{M \cdot r2}{L2 \cdot M \cdot i1d} = \frac{M \cdot r2}{L1 \cdot M \cdot i1d} = \frac{r2}{L1 \cdot i1d}$$

Then, the above equation can be expressed by a in a simple format.

$$Km = \frac{r2}{\phi} \quad (10)$$

where $\phi$ is the flux parameter equal to $L_1 \cdot i_{1d}(\phi=L_1 \cdot i_{1d})$.

A secondary resistance error $\Delta r_2^*$ is correlated with the primary inductance and is obtained at a resistance identifier 48 in accordance with the following equation.

$$\Delta r_2^* = \alpha \cdot \Delta i_{1d}^*$$

where $\alpha$ is a correlation factor and $\Delta i_{1d}^*$ is excitation current error obtained in the above for correction of the primary inductance.

Thus obtained secondary resistance error $\Delta r_2^*$ is added to an initially set secondary resistance $r_2^{*i}$ to give true secondary resistance $r_2^*$, which is subsequently multiplied by $1/\phi$ at a multiplier 49 to give the precise motor constant Km for determination of the slip frequency $\omega_s^*$ and therefore the primary frequency $\omega$.

Temperature compensation for primary resistance

The present system further contemplates to compensate for variation in the primary resistance $r_1$ due to environmental temperature change. Any primary resistance error $\Delta r_1$ appearing after compensation of the primary resistance $r_1$ and the primary inductance $L_1$ made in the time periods $D_1$ and $D_2$ of FIG. 5, is thought to result solely from the temperature of the motor. In order to compensate for the primary resistance caused by the temperature, the speed controller 30 operates to close the switch 42 and open the switch 45 during a subsequent time period $D_3$, for obtaining the primary resistance error $\Delta r_1^*$ and providing the correct primary resistance $r_1^*$ in the same manner as described in the above, whereby achieving consistent speed control free from temperature change.

The above periods $D_1$, $D_2$, and $D_3$ may be provided as default periods in consideration of the rating and operating condition of the motor or may be suitably altered during the operation of the motor.

Apart from the above compensations for determination of the correct motor constant Km, the vector processor 20 includes a current regulator 28 which operates in a proportional control mode to cancel the difference $\Delta i_{1d}$ which appears temporarily between excitation current command $i_{1d}^*$ and the sensed excitation current $i_{1d}$ due to instantaneous fluctuation of the currents.

Figure 6:
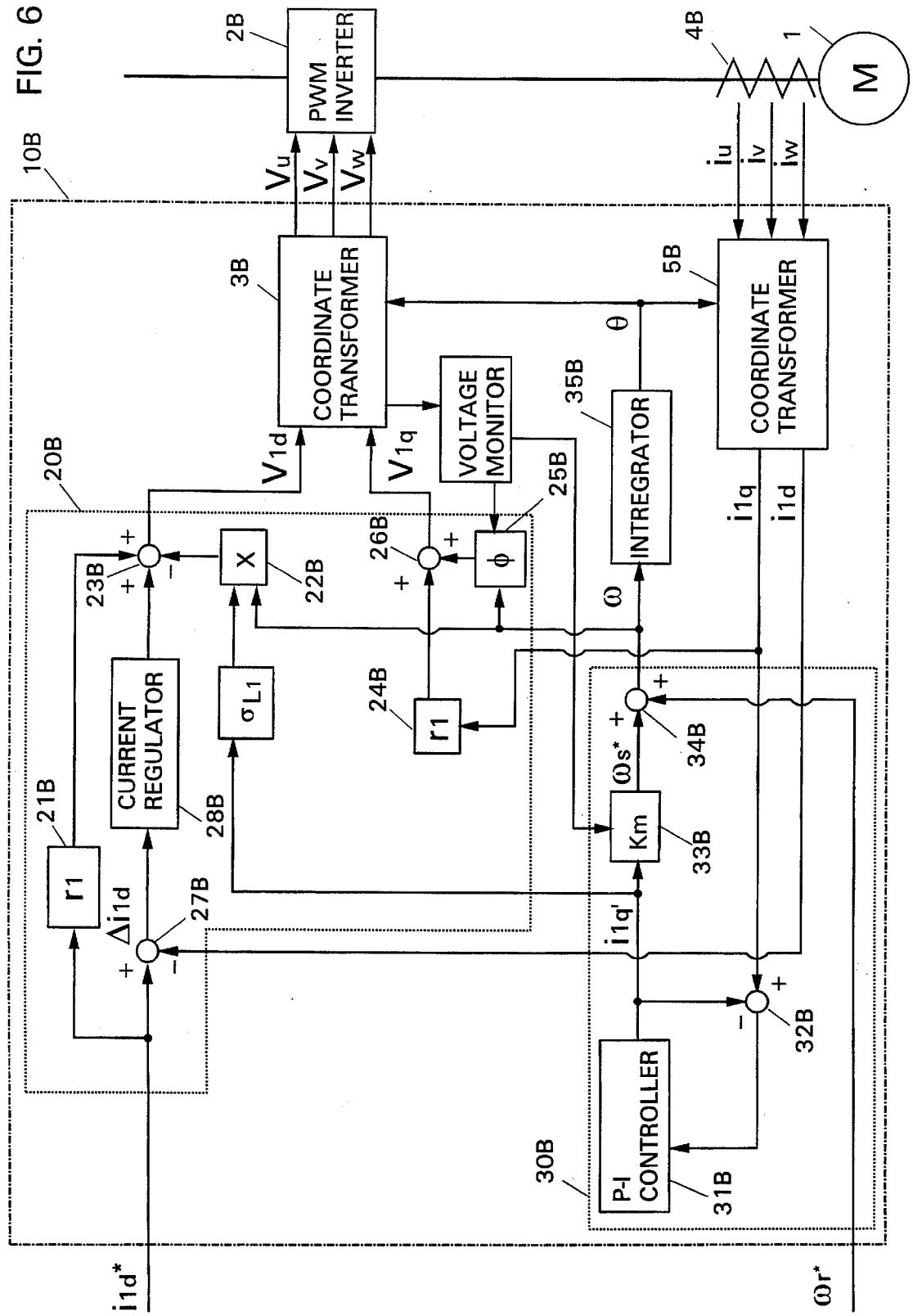
FIG. 6 is a block diagram of a vector control system in accordance with a second embodiment of the present invention.

Second embodiment <FIG. 6>

FIG. 6 illustrates a vector control system in accordance with a second embodiment of the present invention which is similar to the first embodiment except that a voltage monitor 50 is included to monitor a primary voltage $V_1$ from the output of coordinate transformer 3B, which primary voltage $V_1$ is expressed by the equation:

$$V1 = \sqrt{V1d + V1q}$$

For easy reference purpose, like elements are designated by like numerals with a suffix letter of "B" and compensator 40 shown in the first embodiment is removed from the figure. When the primary voltage $V_1$ is produced by the vector processor 20B becomes greater to such an extent as to give control voltage exceeding a limit input voltage of the inverter, i.e., the primary voltage $V_1$ saturates, the voltage monitor 50 responds to lower the flux parameter $\phi$ and therefore the resulting torque voltage $V_{1q}$ until the primary voltage $V_1$ is lowered so as not to saturate and therefore to lower the inverter input voltage below the limit voltage. Thus lowered flux parameter $\phi$ is also fed to multiplier 33B to correspondingly correct the motor constant Km in accordance with the above equation (10), and therefore to correct the primary frequency $\omega$, whereby assuring consistent speed control.

Figure 7:
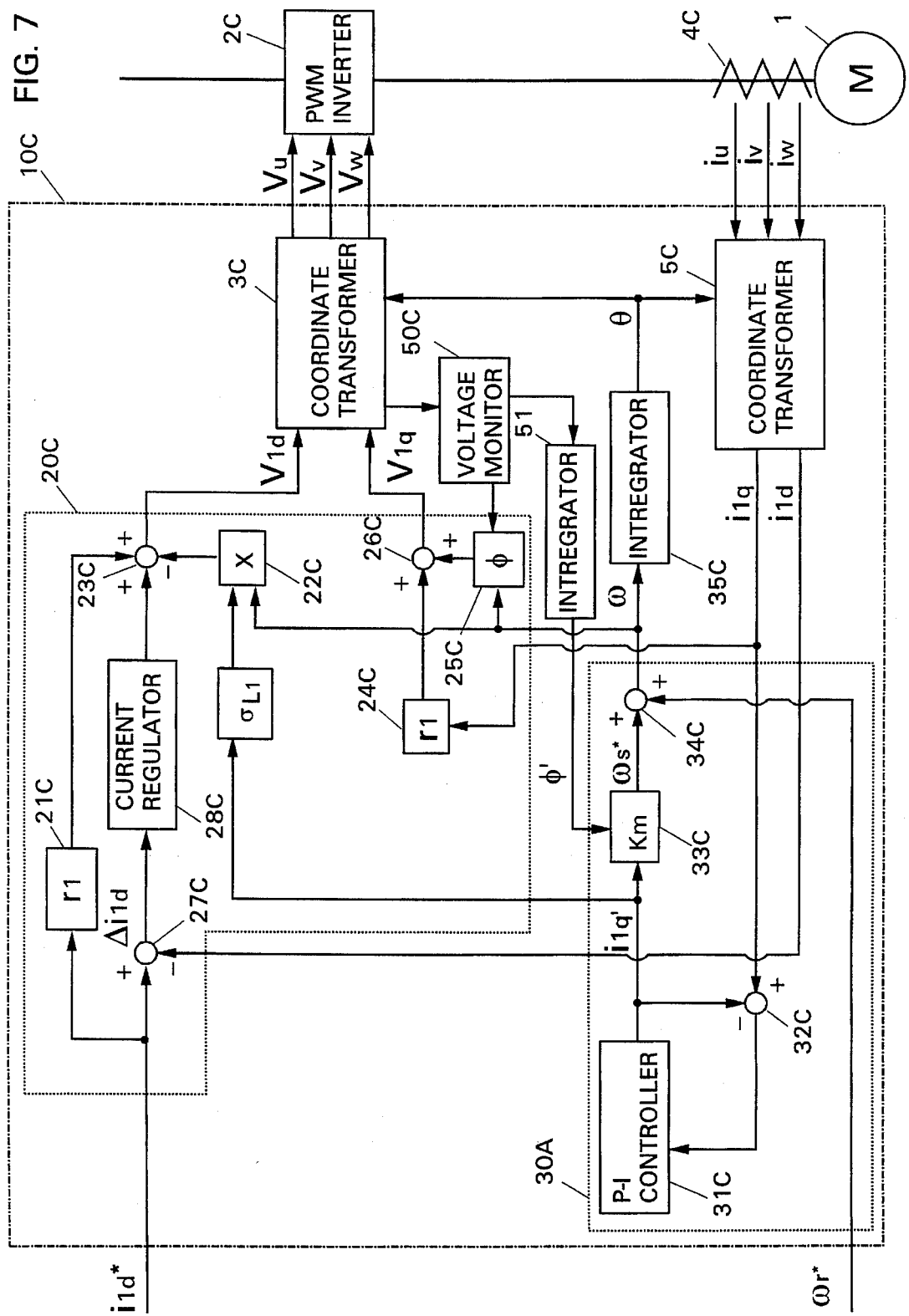
FIG. 7 is a block diagram of a vector control system in accordance with a third embodiment of the present invention.

Third embodiment <FIG. 7>

FIG. 7 illustrates a vector control system in accordance with a third embodiment of the present invention which is similar to the second embodiment except that an integrator 51 is added to give a delayed flux parameter $\phi'$ for moderating the change of the motor constant Km determined at multiplier 33C. For easy reference purpose, like elements are designated by like numerals with a suffix letter of "C". When the primary voltage $V_1$ is detected at the voltage monitor 50C to saturate, the voltage monitor 50C provides a lowering flux parameter $\phi$ to correspondingly lower the torque voltage $V_{1q}$ in the manner as discussed in the second embodiment. Upon this occurrence, the integrator 51 responds to integrate the lowering flux parameter $\phi$ to give delayed or moderate flux parameter $\phi'$ for determination of the motor constant Km in accordance with the equation:

$$Km = \frac{r2}{\phi'}$$

The resulting motor constant Km changes moderately so as to eliminate undesired fluctuation in the motor speed for improved speed control.

Figure 8:
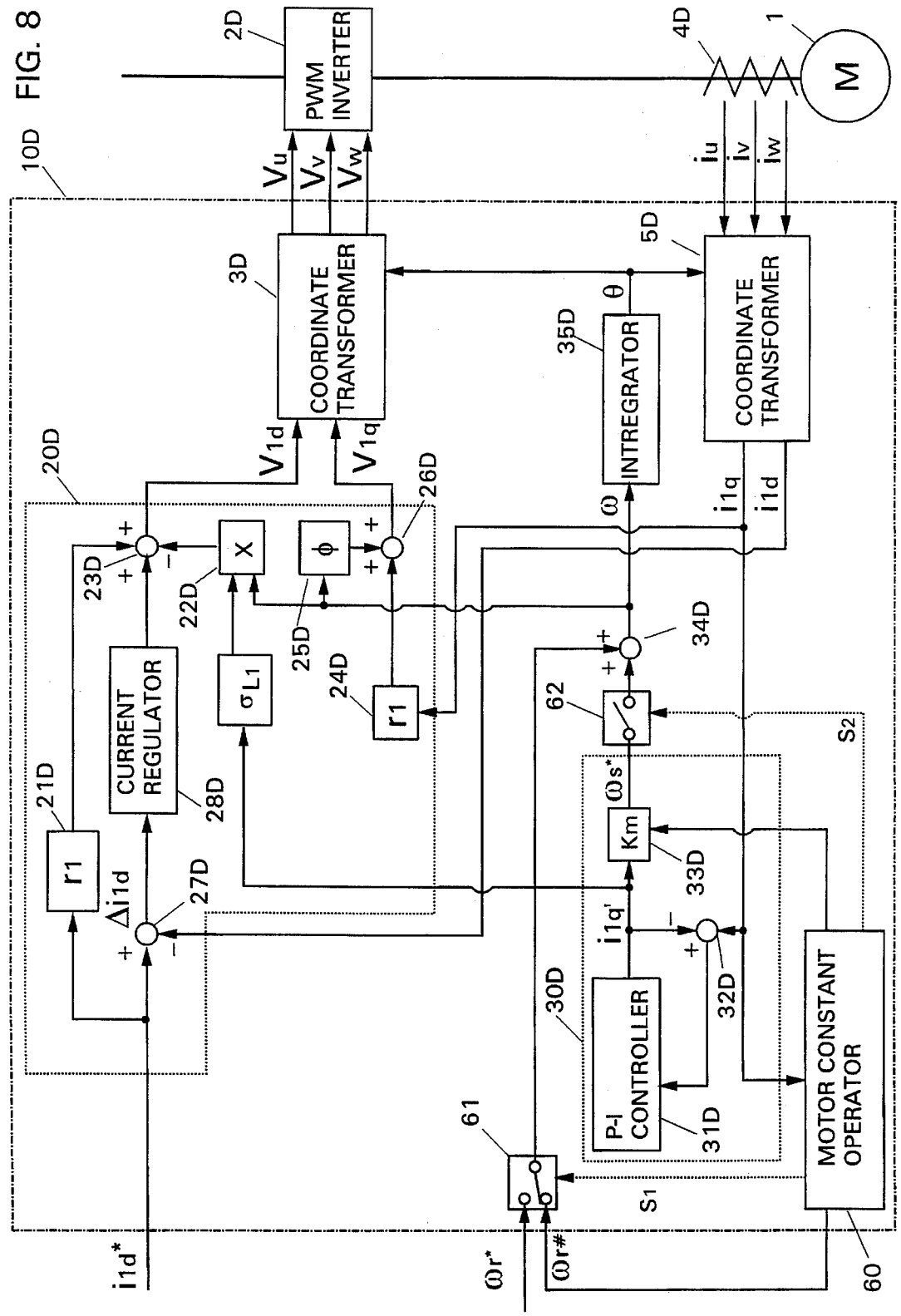
FIG. 8 is a block diagram of a vector control system in accordance with a fourth embodiment of the present invention.
Figure 9A:
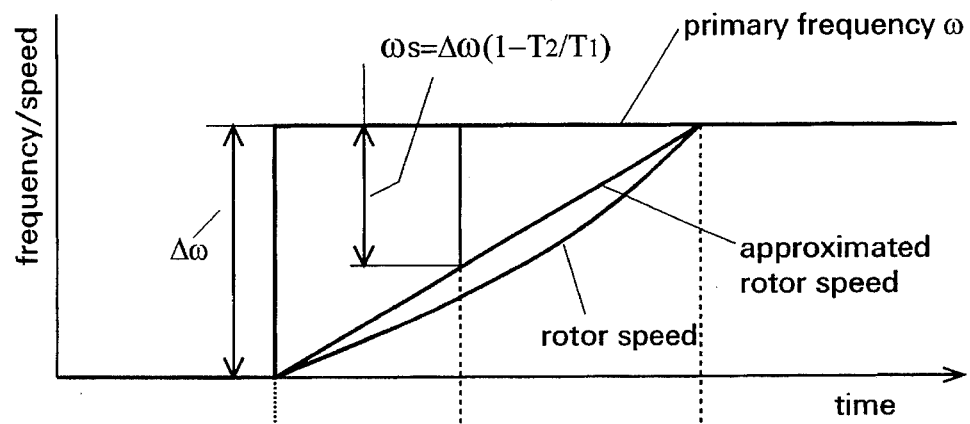
Figure 9A:
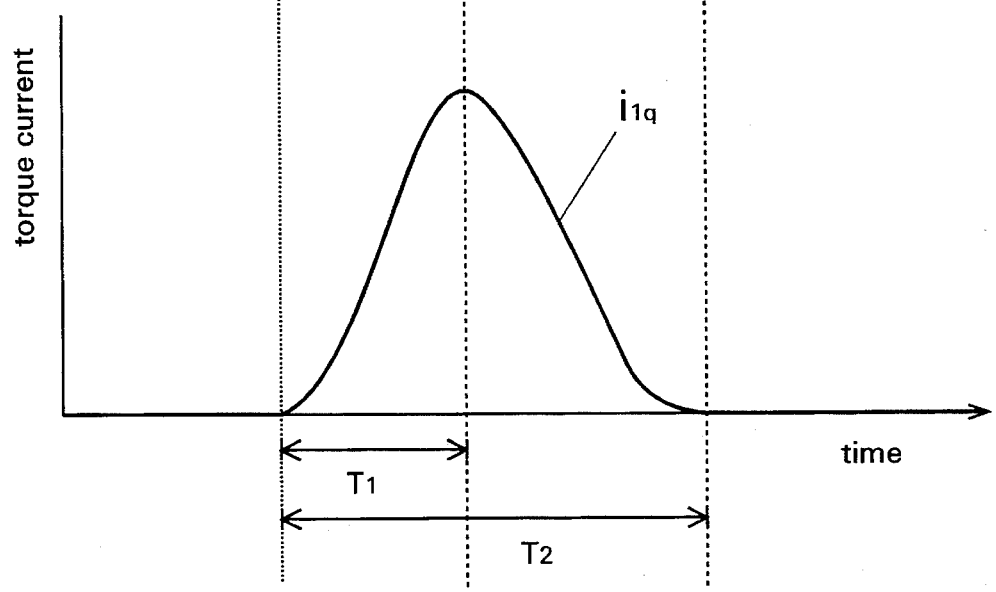

Fourth embodiment <FIGS. 8, 9A, and 9B>

FIG. 8 illustrates a vector control system in accordance with a fourth embodiment of the present invention which is identical to the first embodiment but discloses a scheme of determining the secondary resistance $r_2$. Like elements are designated by like numerals with a suffix letter of "D". In this embodiment, the secondary resistance $r_2$ is determined in accordance with the following equation:

$$r2 = \frac{L2 \cdot \phi 2d}{M \cdot i1q} \cdot \omega s - \frac{\sigma \cdot L1}{i1q} \cdot p \cdot i1q \quad (11)$$

The above equation (11) is obtained by rewriting the equation (8). Thus, the correct secondary resistance $r_2$ can be obtained by evaluating the slip frequency $\omega_s$ and the torque current $i_{1q}$. In order to cancel the second term of equation (11) for simplifying the calculation, it is made to use a maximum torque current $i_{1d(max)}$ which, as shown in FIG. 9B, has zero differential coefficient. That is, equation (11) is simplified into $$r2 = \frac{L2 \cdot \phi 2d}{M \cdot i1q(\max)} \cdot \omega s \cong \frac{\phi}{i1q(\max)} \cdot \omega s \quad (12)$$

when taking into consideration that $L_2$ is nearly equal to M and $\phi$ is nearly equal to $\phi_{2d}$.

The slip frequency $\omega_s$ is evaluated by analyzing the waveform of the detected torque current $i_{1q}$ which is obtained by varying the motor speed by one increment $\Delta\omega$ over a time period $T_2$, as shown in FIGS. 9A and 9B, under a condition of applying no load. Assuming that the motor speed varies approximately linearly while incrementing the primary frequency by $\Delta\omega$, the slip frequency $\omega_s$ at the maximum torque current $i_{1q(max)}$ is obtained by the following equation:

$$\omega s = \Delta\omega \left(1 - \frac{T2}{T1}\right) \quad (13)$$

where $T_1$ is a time required for torque current $i_{1q}$ to reach its maximum from the start of varying the primary frequency $\omega$, and $T_2$ is a time required for torque current $i_{1q}$ to settles to zero.

Thus obtained slip frequency $\omega_s$ and the maximum torque current $i_{1q(max)}$ are substituted into equation (12) to give the correct secondary resistance $r_2$, which is then utilized to determine the motor constant Km in accordance with the above equation (10) for consistent vector control of the motor speed.

In order to determine the secondary resistance $r_2$, the system includes a motor constant operator 60 which receives the detected torque current $i_{1q}$ from the coordinate transformer 5D and outputs a speed signal $\omega_r\#$ to a selector 61. The selector 61 is normally set in position to feed the speed command $\omega_r^*$ to the adder 34D for determination of the primary frequency $\omega$ by addition of the speed command $\omega_r^*$ to the slip frequency $\omega_s$ which is derived from the delayed torque current signal $i_{1q}'$ obtained at the P-I controller 31D. The operator 60, when determining the secondary resistance $r_2$, issues a control signal $S_1$ which causes the selector 61 to receive the speed signal $\omega_r\#$ from the operator 60 instead of the speed command $\omega_r^*$ and feed it to the adder 34D. At the same time, the controller 60 issues a control signal $S_2$ which opens a switch 62 inserted before the adder 34D so as to exclude the slip frequency cos resulting from the P-I controller 31D. Under this condition, the controller 60 outputs the speed signal $\omega_r\#$ for rotating the motor at a fixed speed. After the motor reaches a steady-state condition, which is acknowledged by monitoring the torque current $i_{1q}$, the controller 60 increments the speed signal $\omega_r\#$ by $\Delta\omega$ and at the same time starts counting a time. After the motor reaches again steady-state, the controller 60 stops counting the time to obtain the above time period $T_2$, while obtaining above time period $T_1$ from the maximum torque current $i_{1q}$ being monitored. Then, the operator 60 executes the above equations (13) and (12) to determine the secondary resistance $r_2$ and the motor constant Km. After determination of the motor constant Km, the operator 60 responds to make the selector 61 to return into its normal position and close the switch 62 so that the system is enabled to effect the vector control in the manner as discussed with reference to the first embodiment.

Figure 10:
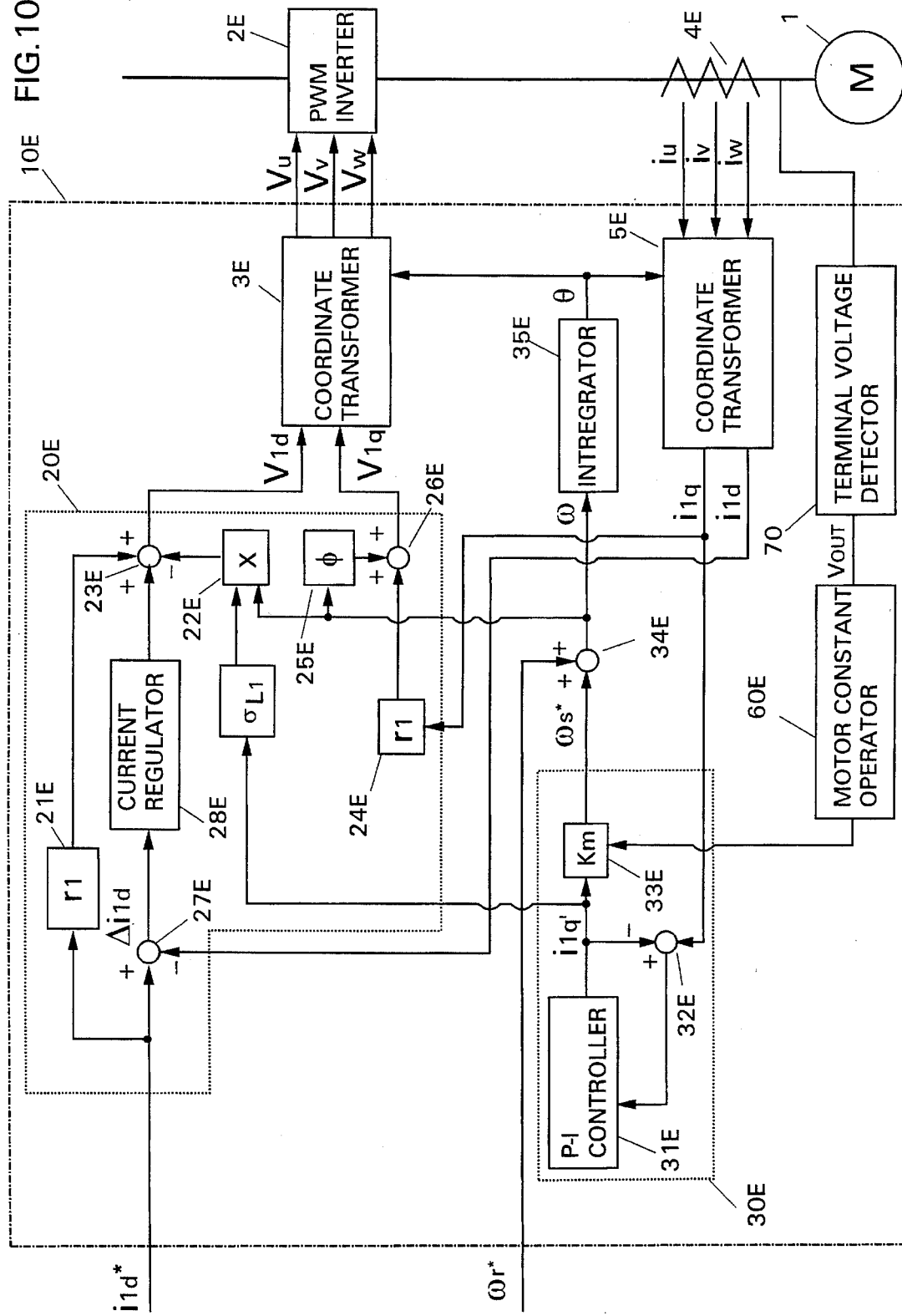
FIGS. 10 and 11 are block diagrams of a vector control system in accordance with a fifth embodiment of the present invention.
Figure 11:
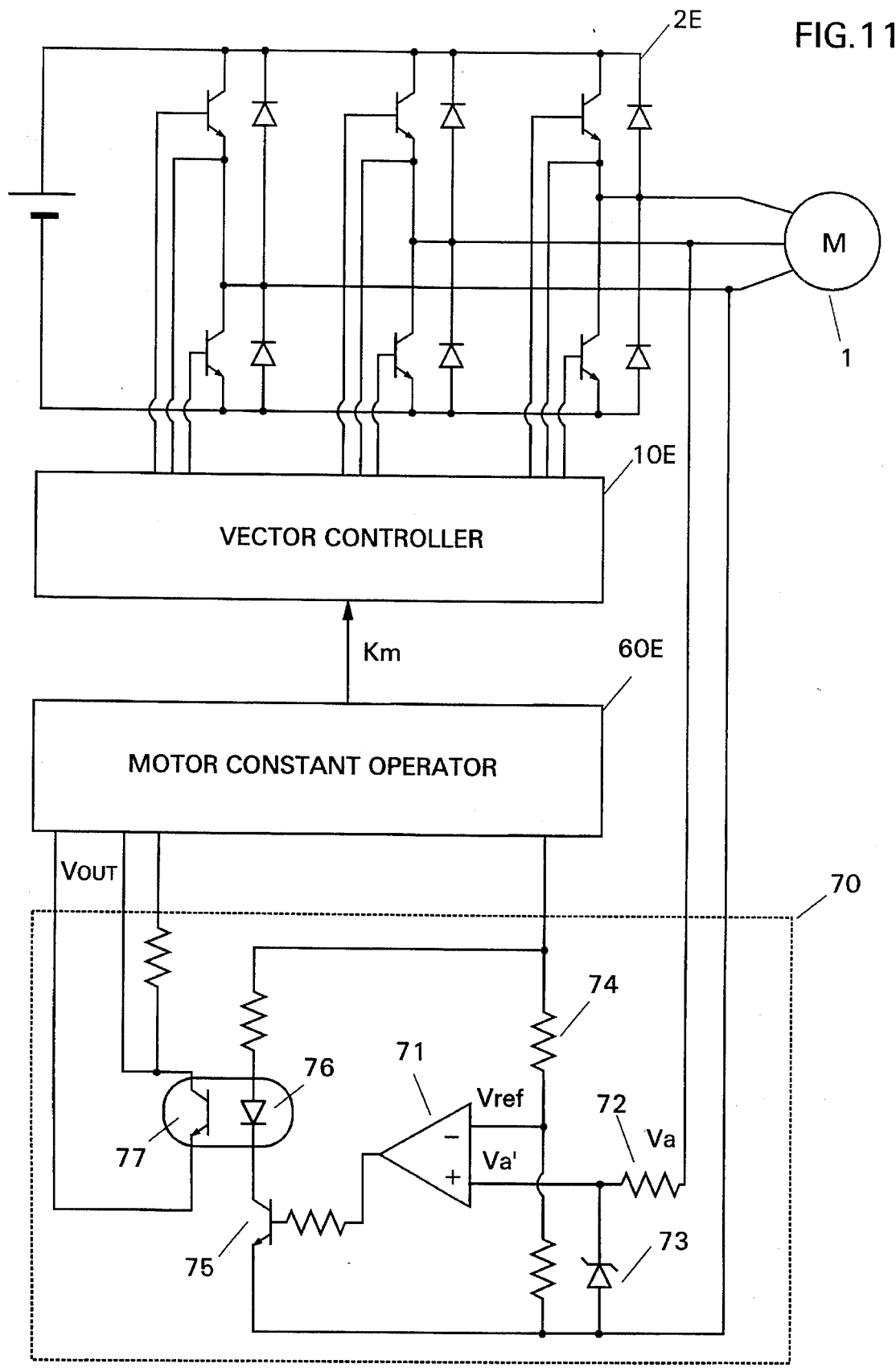
Figure 12:
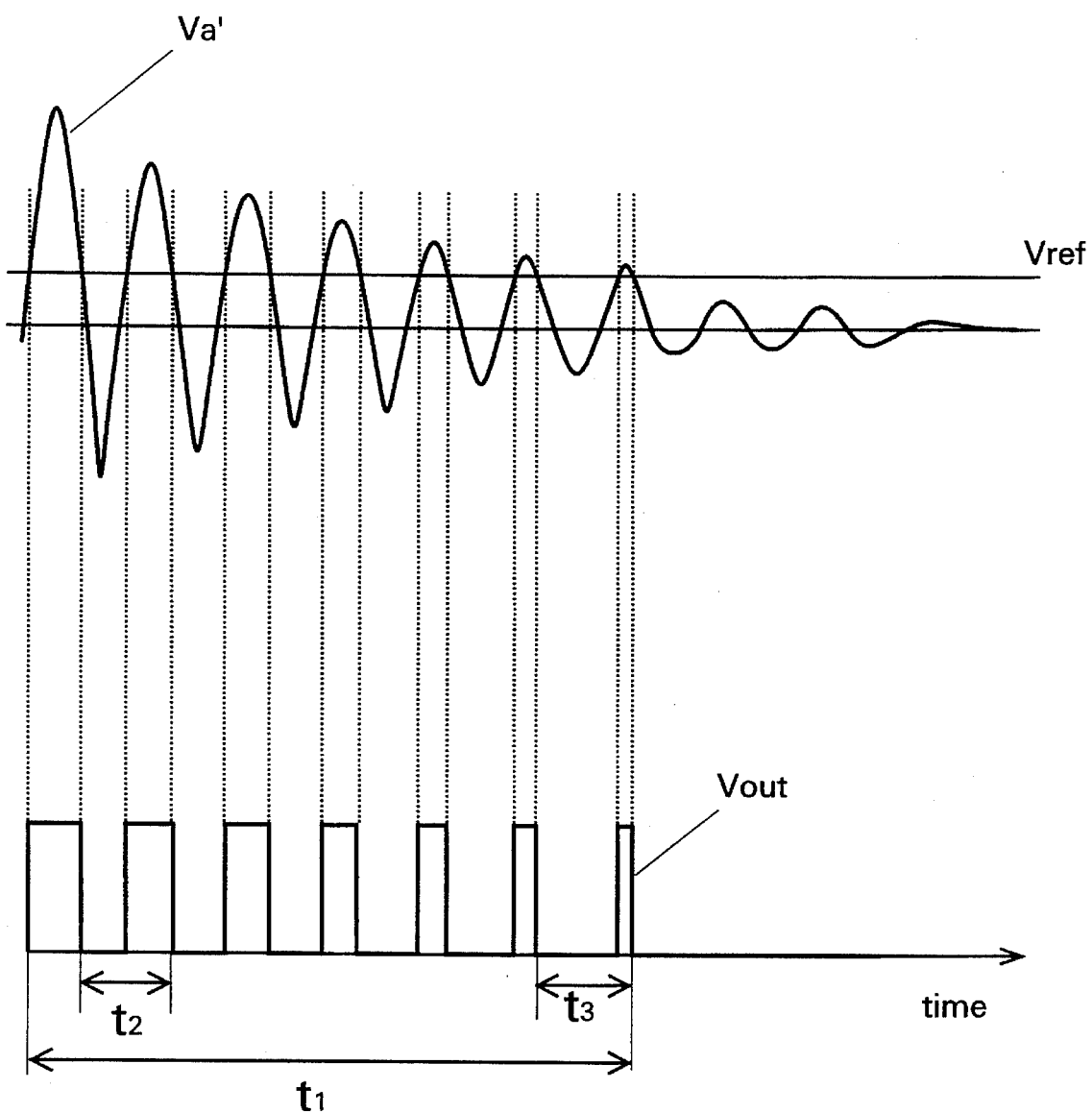
FIG. 12 is a graph illustrating the operation of the system of FIGS. 10 and 11.

Fifth embodiment <FIGS. 10 to 12>

FIG. 10 illustrates a vector control system in accordance with a fifth embodiment of the present invention which is identical to the first embodiment but discloses another scheme of determining the secondary resistance $r_2$. Like elements are designated by like numerals with a suffix letter of "E". In this embodiment, the secondary resistance $r_2$ is determined by analyzing a waveform of a varying terminal voltage Va which appears in response to sudden interrupting the operating voltage to the induction motor 1E. When the operating voltage is suddenly interrupted, the terminal voltage Va will dampen over a relatively long period to zero in accordance with the following equation:

$$Va = -\sqrt{2} \cdot \omega r \cdot M \cdot I20 \cdot e^{-t/T0} \cdot \sin(\omega r \cdot t + \phi 0)$$

where

M=mutual inductance;
$\omega_r$=rotor speed of motor;
$I_{20}$=effective value of secondary current appearing immediately after interruption of the operating voltage;
$T_0$=damping factor (=$L_2/r_2$).

Figure 13:
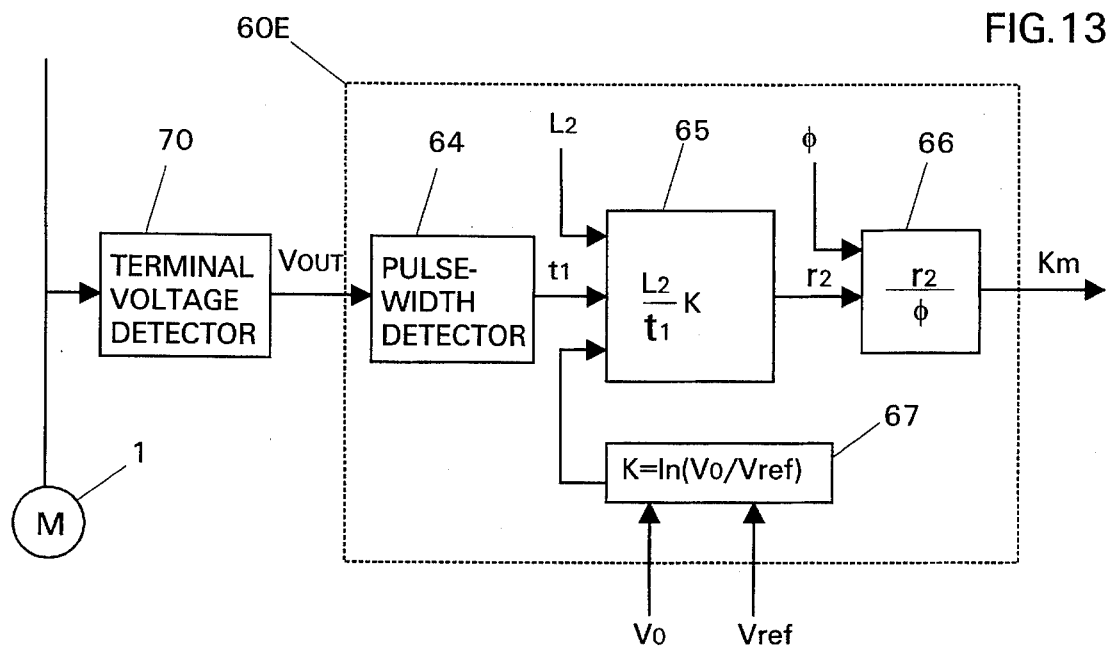
FIG. 13 is a block diagram schematically illustrating the operation for determination of a motor constant Km.

Since this equation gives a relation that the terminal voltage is dependent upon the damping factor ($T_0=L_2/r_2$), the secondary resistance $r_2$ can be determined by analyzing the waveform of the terminal voltage Va provided that the secondary inductance $L_2$ is known. For this purpose, the system includes a voltage detector 70 connected to monitor the terminal voltage Va of the motor 1E, in addition to a motor constant operator 60E which determines the secondary resistance $r_2$ and therefore the motor constant Km based upon an output of voltage detector 70. As shown in FIG. 11, the voltage detector 70 comprises a comparator 71 which compares a voltage Va' indicative of the terminal voltage Va with a predetermined reference voltage Vref. The voltage Va' is limited below a zener voltage by a combination of a resistor 72 and a zener diode 73. The reference voltage Vref is obtained by dividing the source voltage by a resistor 74. Firstly, the motor constant operator 60E issues a stop signal to turn off all switching transistors of the inverter 2E to suddenly interrupt feeding the operating voltage to the motor 1, in response to which the voltage Va' starts dampens, as indicated by waveforms in FIG. 12, with the resulting decrease in amplitude. While the voltage Va' exceeds the reference voltage Vref, the comparator 71 outputs a signal to turn on a transistor 75 to flow a current through a photo-diode 76, thereby turning on a photo-transistor 77 to produce an output pulse Vout. The output pulse Vout is then fed to a pulse-width detector 64 provided in the operator 60E, as shown in FIG. 13, so as to give a time period $t_1$ which extends from the sudden interruption of the operating voltage and terminates at a time when the last output pulse Vout disappears. Thus obtained time period $t_1$ is fed to a resistance processor 65 to determine the secondary resistance $r_2$ in accordance with the following equation:

$$r2 = \frac{L2}{t1} \cdot \ln\left(\frac{V0}{Vref}\right) \quad (14)$$

where $L_2$ is a known secondary inductance input to the processor 65, $V_0$ is an operating voltage applied immediately before the interruption thereof. The logarithmic value $K=\ln(V_0/Vref)$ is calculated at a logarithm processor 67 based upon $V_0$ and Vref. Subsequently, the resulting secondary resistance $r_2$ is fed to a divider 66 where it is divided by the known flux parameter $\phi$ to give the motor constant Km for determination of the slip frequency $\omega_s(=i_q \cdot Km)$. With this scheme, the secondary resistance $r_2$ can be determined without relying upon additional voltage and speed detectors.

Figure 14:
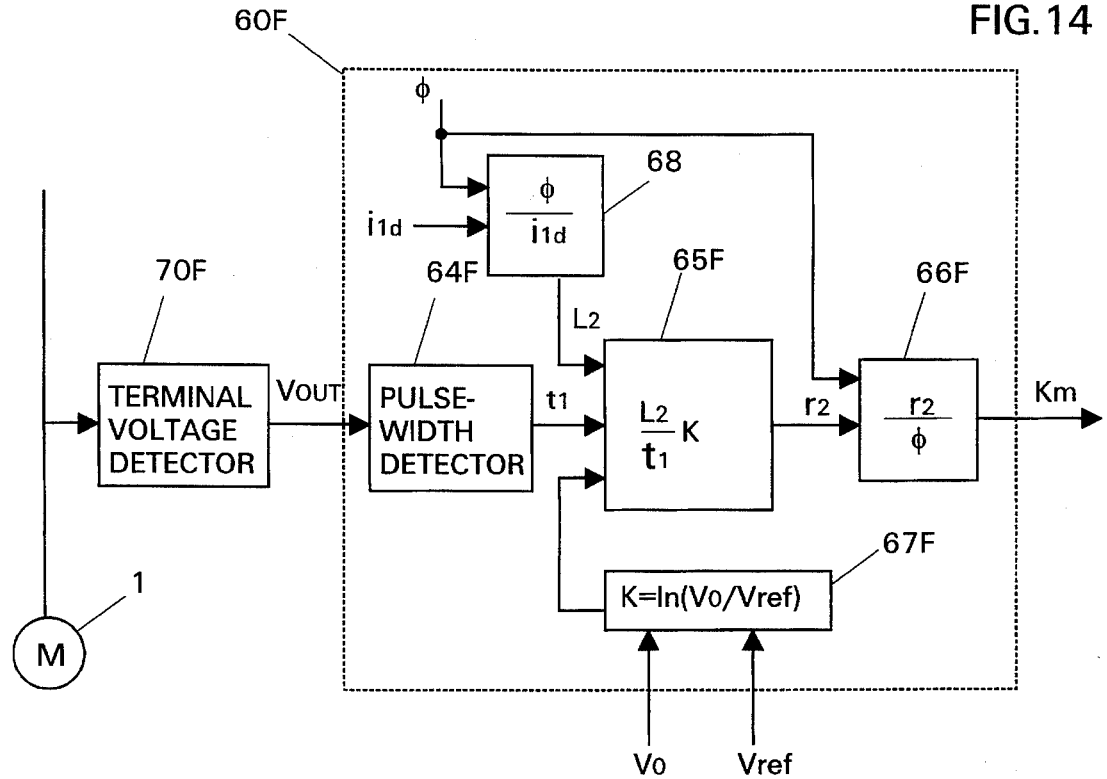
FIGS. 14 to 16 are block diagrams schematically illustrating other operations for determination of the motor constant Km in accordance with modifications of the sixth embodiment.

First modification of the fifth embodiment <FIG. 14>

FIG. 14 illustrates a modified scheme of determining the motor constant Km which is similar to the fifth embodiment except that the secondary inductance $L_2$ is given by dividing the known flux parameter $\phi$ by the detected excitation current $i_{1d}$ at an additional inductance processor 68. Since the flux parameter $\phi = i_{1d} \cdot M$ and is approximated into the relation $\phi = i_{1d} \cdot L_2$ where M is nearly equal to $L_2$, the above equation (14) is modified into the following equation (15):

$$r2 = \frac{\phi}{i1d \cdot t1} \cdot \ln\left(\frac{V0}{Vref}\right) \quad (15)$$

The secondary resistance $r_2$ is obtained in accordance with equation (16) and is then processed in the same manner as in the fifth embodiment. In FIG. 14, like elements are designated by like numerals with a suffix letter of "F" for easy reference purpose.

Figure 15:
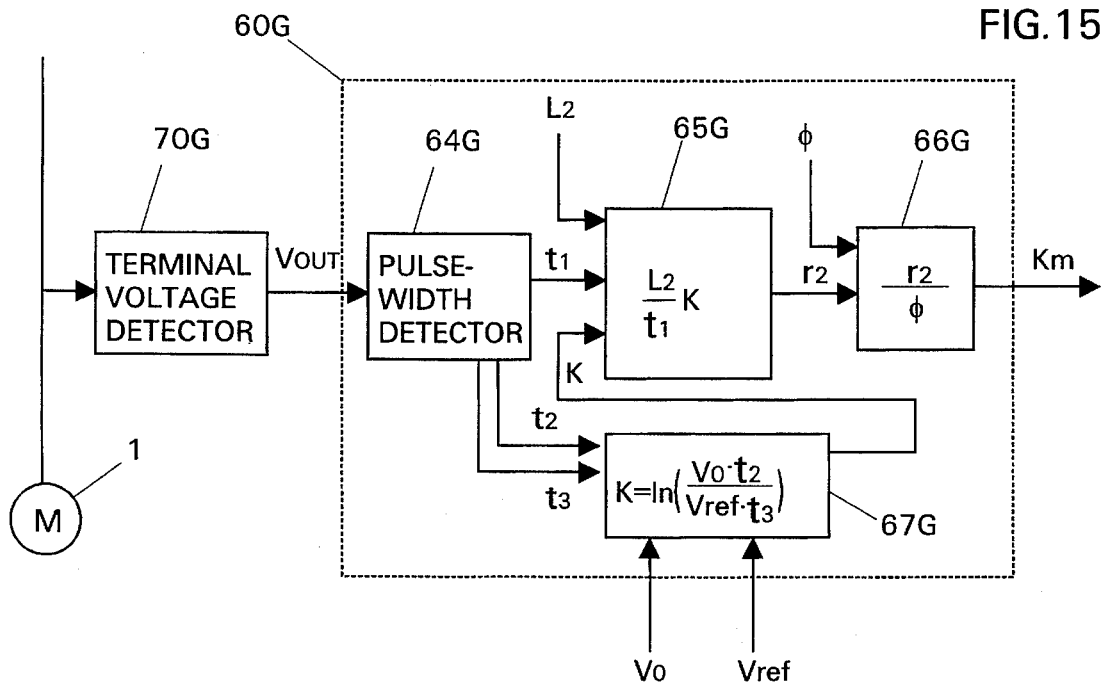

Second modification of the fifth embodiment <FIG. 15>

FIG. 15 illustrates a second modified scheme of determining the motor constant Km which is similar to the fifth embodiment except that the secondary resistance $r_2$ is determined in accordance with the following equation (16):

$$r2 = \frac{L2}{t1} \cdot \ln\left(\frac{V0 \cdot t2}{Vref \cdot t3}\right) \quad (16)$$

where $t_2$=cycle of the output pulse Vout firstly appearing immediately after the interruption of the operating voltage as defined in FIG. 12; and
$t_3$=cycle of the last appearing output pulse Vout as defined in FIG. 12. In this modification, like elements are designated by like numerals with a suffix letter of "G". In response to the output pulse Vout from voltage detector 70G, the pulse-width detector 64G provides thus defined parameters $t_1$, $t_2$, and $t_3$ to resistance processor 65G as well as to logarithm processor 67G which in turn provides a logarithm value $K=\ln(V_0 \cdot t_2/Vref \cdot t_3)$ to resistance processor 65G. Then, resistance processor 65G calculates $r_2$ in accordance with equation (16) based upon the inputs of thus obtained $t_1$, K, and the known $L_2$. The resulting secondary resistance $r_2$ is divided by the known flux parameter $\phi$ at divider 66G for determination of the motor constant Km.

Figure 16:
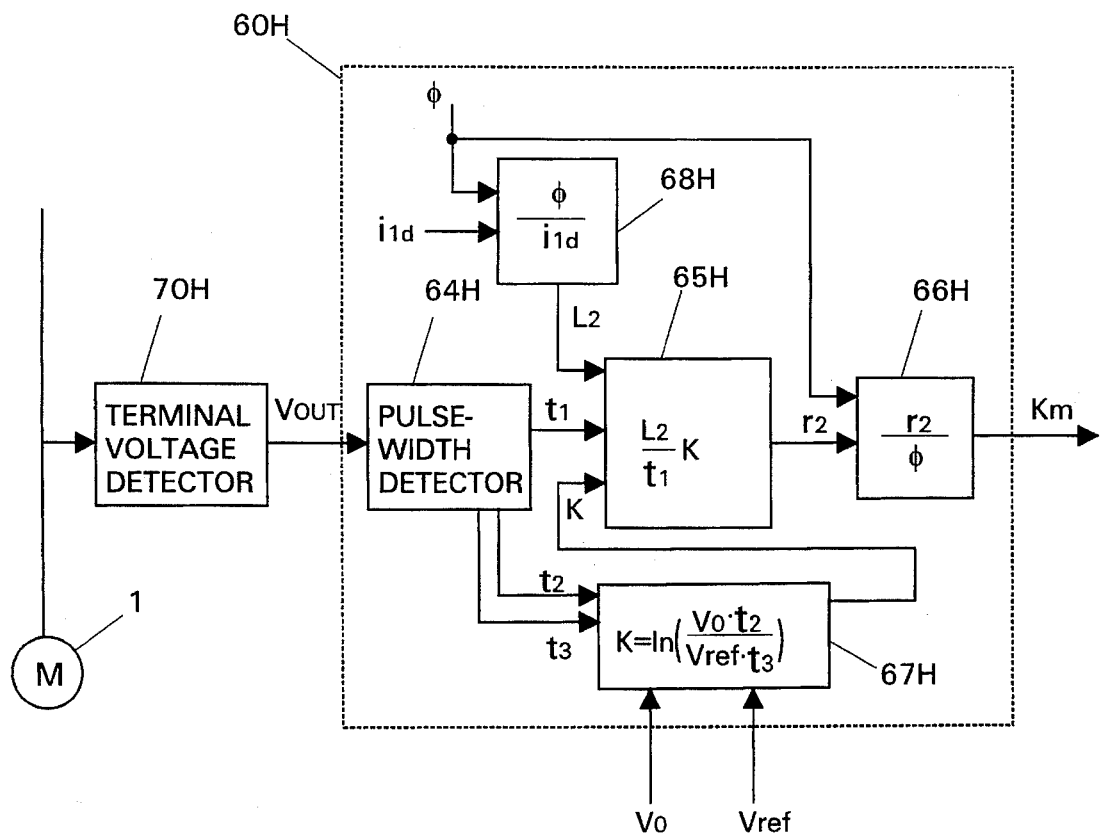

Third modification of the fifth embodiment <FIG. 16>

FIG. 16 illustrates a modified scheme of determining the motor constant Km which is similar to the modification of FIG. 15 except that the secondary inductance $L_2$ is given by dividing the known flux parameter $\phi$ by the detected excitation current $i_{1d}$ at additional inductance processor 68H. Since the flux parameter $\phi = i_{1d} \cdot M$ and is approximated into the relation $\phi = i_{1d} \cdot L_2$ where M is nearly equal to $L_2$, the above equation (16) is modified into the following equation (17):

$$r2 = \frac{\phi}{i1d \cdot t1} \cdot \ln\left(\frac{V0 \cdot t2}{Vref \cdot t3}\right) \quad (17)$$

The secondary resistance $r_2$ is obtained at resistance processor 65H in accordance with equation (17) and is then processed at divider 66H in the same manner as in the modification of FIG. 15 to determine the motor constant Km. In FIG. 16, like elements are designated by like numerals with a suffix letter of "H" for easy reference purpose.

What is claimed is:

1. A vector control method for controlling a rotor speed of an induction motor by use of an inverter which provides an AC current of varying frequency to said induction motor, and a vector controller which provides control voltage Vu, Vv, Vw, in response to an excitation current command $i_{1d*}$ indicative of an excitation current being fed to said induction motor, a desired rotation speed command $\omega_{r*}$, and a primary frequency $\omega$, for controlling said inverter to vary said rotor speed, said method comprising the steps of:

detecting a primary current being fed to said induction motor;

analyzing said detected primary current to derive therefrom an excitation current $i_{1d}$ and a detected torque current $i_{1q}$;

multiplying a torque value represented by said detected torque current $i_{1q}$ by a predetermined motor constant $K_m$ to obtain a slip frequency $\omega_s$; and adding thus obtained slip frequency $\omega_s$ to said rotation speed command $\omega_{r*}$ to determine said primary frequency $\omega$ ($\omega=\omega_{r*}+\omega_s$);

calculating a deviation between said delay torque current $i_{1q'}$ and said detected torque current $i_{1q}$ and supplying said deviation to a proportional plus integral controller, said proportional plus integral controller producing as an output an updated delayed torque current $i_{1q'}$ as said torque value for determining said primary frequency $\omega$.

2. The method as set forth in claim 1, further including the step of correcting said excitation current command $i_{1d}*$ in a direction of zeroing the difference between said excitation current command $i_{1d}*$ and said detected excitation current $i_{1d}$.

3. The method as set forth in claim 1, wherein said vector controller additionally receives a primary resistance set value $r_1*$ indicative of a primary resistance $r_1$ of said induction motor in determining said control voltage, said method further including the steps of:

supplying primary current and holding said motor to stall, and correcting said primary resistance set value $r_1*$ in a direction of zeroing a difference between said excitation current command $i_{1d}*$ and said detected excitation current $i_{1d}$, under a condition of supplying said primary current to said induction motor while holding said motor to stall, and subsequently correcting said excitation current $i_{1d}*$ in a direction of zeroing the difference between said excitation current $i_{1d}*$ and said detected excitation current $i_{1d}$, under a condition of varying the rotation speed.

4. The method as set forth in claim 3, wherein said method further includes the step of:

correcting again said corrected primary resistance set value $r_1*$ in a direction of zeroing a difference between said excitation current command $i_{1d}*$ and said detected excitation current $i_{1d}$, after correcting said excitation current command $i_{1d}*$.

5. The method as set forth in any one of claims 2 to 4, wherein said vector controller additionally receives a secondary resistance set value $r_2*$ indicative of a secondary resistance and a primary inductance $L_1$ of said induction motor in determining said control voltage, said method further including the step of:

correcting said secondary resistance set value $r_2*$ in a direction of zeroing a difference between said excitation current command $i_{1d}*$ and said detected excitation current $i_{1d}$; and determining said motor constant Km in accordance with a following equation:

$$Km = \frac{r2}{\phi}$$

where $r_2$ is secondary rotor resistance, $\phi$ is a flux parameter equal to $L_1 \cdot i_{1d}*$ ($\phi = L_1 \cdot i_{1d}*$).

6. The method as set forth in claim 1, wherein said vector controller acknowledges a primary resistance $r_1$, a primary inductance $L_1$, and a predetermined equivalent leakage inductance of said induction motor for determination of said control voltage, said method further including the steps of:

multiplying said primary inductance $L_1$ by said excitation current command $i_{1d}*$ to obtain a flux parameter $\phi$;

obtaining a first product of said primary resistance $r_1$ and said excitation current command $i_{1d}*$;

obtaining a second product of said delayed torque current $i_{1q'}$, said equivalent leakage inductance $\sigma \cdot L_1$, and said primary frequency $\omega$;

subtracting said second product from said first product to provide an excitation voltage $V_{1d}$;

obtaining a third product of said detected torque current $i_{1q}$ and said primary resistance $r_1$;

obtaining a fourth product of said flux parameter $\phi$ and said primary frequency $\omega$;

adding said third product and fourth product to provide a torque voltage $V_{1q}$; and processing said excitation voltage $V_{1d}$ and torque voltage $V_{1q}$ to give said control voltage.

7. The method as set forth in claim 6, further including the steps of:

monitoring a primary voltage $V_1$; and varying said flux parameter $\phi$ in accordance with said monitored primary voltage $V_1$ in order to correct the primary frequency $\omega$ which is a function of said flux parameter $\phi$.

8. The method as set forth in claim 7, further comprising the step of setting said motor constant Km equal to $r_2/\phi$, in which $r_2$ represents a secondary resistance of said induction motor.

9. The method as set forth in claim 8, further comprising the step of varying said motor constant Km by integrating said varying flux parameter $\phi$.

10. The method as set forth in claim 1, wherein said motor constant Km varies in proportion to a secondary resistance $r_2$ of said induction motor, said method further including the following steps of:

a) providing a time frame where no said slip frequency $\omega_s$ is obtained from said delayed torque current $i_{1q'}$;

b) incrementing said rotation speed command $\omega_r*$ by $\Delta\omega$ within said time frame and under no load condition;

c) analyzing thus obtained waveform of said detected torque current $i_{1q}$ to determine said secondary resistance $r_2$ and therefore determine said motor constant Km.

11. The method as set forth in claim 10, wherein said step c) comprises the sub-steps of:

determining a maximum torque current $i_{1q(max)}$ from said waveform;

obtaining a first time period $T_1$ when said detected torque current $i_{1q}$ increases from a start value just before incrementing said rotation speed command value $\omega_r*$ to said maximum torque current $i_{1q(max)}$;

obtaining a second time period $T_2$ when said detected torque current $i_{1q}$ increases from said start value and settles to a first value past said maximum torque current $i_{1q(max)}$; and determining said secondary resistance $r_2$ in accordance with a following equation:

$$r2 = \frac{\phi}{i1q(max)} \Delta\omega r \left(1 - \frac{T1}{T2}\right)$$

wherein $\phi$ is a predetermined flux parameter.

12. The method as set forth in claim 1, wherein said motor constant Km varies in proportion to a secondary resistance $r_2$ of said induction motor, said method further including the following steps of:

a) suddenly supplying an operating voltage to said induction motor to measure a time period $t_1$ when a terminal voltage Va' of said induction motor dampens to a reference voltage Vref;

b) determining said secondary resistance $r_2$ in accordance with a following equation:

$$r2 = \frac{L2}{t1} \ln\left(\frac{V0}{Vref}\right)$$

wherein $V_0$ is a voltage which has applied to said induction motor immediately before interrupting said operating voltage, and $L_2$ is a secondary inductance of said induction motor.

13. The method as set forth in claim 1, wherein said motor constant Km varies in proportion to a secondary resistance $r_2$ of said induction motor, said method further including the following steps of:

a) suddenly supplying an operating voltage to said induction motor to measure a time period $t_1$ when a terminal voltage Va' of said induction motor dampens to a reference voltage Vref;

b) determining said secondary resistance $r_2$ in accordance with a following equation:

$$r2 = \frac{\phi}{i1d \cdot t1} \ln\left(\frac{V0}{Vref}\right)$$

wherein $\phi$ is a predetermined flux parameter, $i_{1d}$ is said detected excitation current, and $V_0$ is a voltage which was applied to said induction motor immediately before interrupting to supply said operating voltage.

14. The method as set forth in claim 1, wherein said motor constant Km varies in proportion to a secondary resistance $r_2$ of said induction motor, said method further including the following steps of:

a) suddenly supplying an operating voltage to said induction motor to measure a time period $t_1$ when a terminal voltage Va' of said induction motor dampens to a reference voltage Vref;

b) obtaining a first cycle $t_2$ for said terminal voltage Va' appearing immediately after interrupting to supply said operating voltage;

c) obtaining a last cycle $t_3$ for said terminal voltage Va' appearing immediately before damping to said reference voltage Vref; and d) determining said secondary resistance $r_2$ in accordance with a following equation:

$$r2 = \frac{L2}{t1} \ln\left(\frac{V0 \cdot t2}{Vref \cdot t3}\right)$$

wherein $L_2$ is a secondary inductance of said induction motor, and $V_0$ is a voltage which was applied to said induction motor immediately before interrupting said operating voltage.

15. The method as set forth in claim 1, wherein said motor constant Km varies in proportion to a secondary resistance $r_2$ of said induction motor, said method further including the following steps of:

a) abruptly interrupting to supply an operating voltage to said induction motor to measure a time period $t_1$ during which a terminal voltage Va' of said induction motor dampens to a reference voltage Vref;

b) obtaining a first cycle $t_2$ for said terminal voltage Va' appearing immediately after interrupting to supply said operating voltage;

c) obtaining a last cycle $t_3$ for said terminal voltage Va' appearing immediately before damping to said reference voltage Vref; and d) determining said secondary resistance $r_2$ in accordance with a following equation:

$$r2 = \frac{\phi}{i1d \cdot t1} \ln\left(\frac{V0 \cdot t2}{Vref \cdot t3}\right)$$

wherein $\phi$ is a predetermined flux parameter, $i_{1d}$ is said excitation current component, and $V_0$ is a voltage being applied to said induction motor immediately before interrupting said operating voltage.

* * * * *